United States Patent [19]

Jung et al.

[11] 4,296,630

[45] Oct. 27, 1981

[54] APPARATUS FOR CAPACITIVE FILLING-LEVEL MEASURING, PARTICULARLY IN A MOTOR VEHICLE TANK

[75] Inventors: Wilhelm Jung, Giessen-Kleinlinden; Karl Rau, Mühlheim, both of Fed. Rep. of Germany

[73] Assignee: VDO Adolf Schindling AG, Fed. Rep. of Germany

[21] Appl. No.: 124,116

[22] Filed: Feb. 25, 1980

[30] Foreign Application Priority Data

Mar. 5, 1979 [DE] Fed. Rep. of Germany ....... 2908449

[51] Int. Cl.³ ............................................. G01F 23/26
[52] U.S. Cl. .............................. 73/304 C; 324/61 P; 361/284
[58] Field of Search ....................... 73/304 C, 304 R; 361/284; 324/61 P, 65 P

[56] References Cited

U.S. PATENT DOCUMENTS 3,392,581 7/1968 Miller ................................. 361/284

FOREIGN PATENT DOCUMENTS 842554 5/1952 Fed. Rep. of Germany .... 73/304 R
481103 2/1938 United Kingdom ................ 361/284

Primary Examiner—James J. Gill
Assistant Examiner—Denis E. Corr
Attorney, Agent, or Firm—Eric P. Schellin

[57] ABSTRACT

An apparatus for measuring the level of fluid in a container by the use of measuring electrodes forming a measuring condenser, and compensation electrodes forming a compensation condenser by which the effect of various dielectric constants of the medium upon the measuring result can be compensated in an evaluation circuit, wherein the measuring electrodes and compensation electrodes are arranged on an oblong common line in such a manner that the compensation electrodes are located near at least one suction channel for the medium and the measuring electrodes are near the medium to be measured.

11 Claims, 5 Drawing Figures

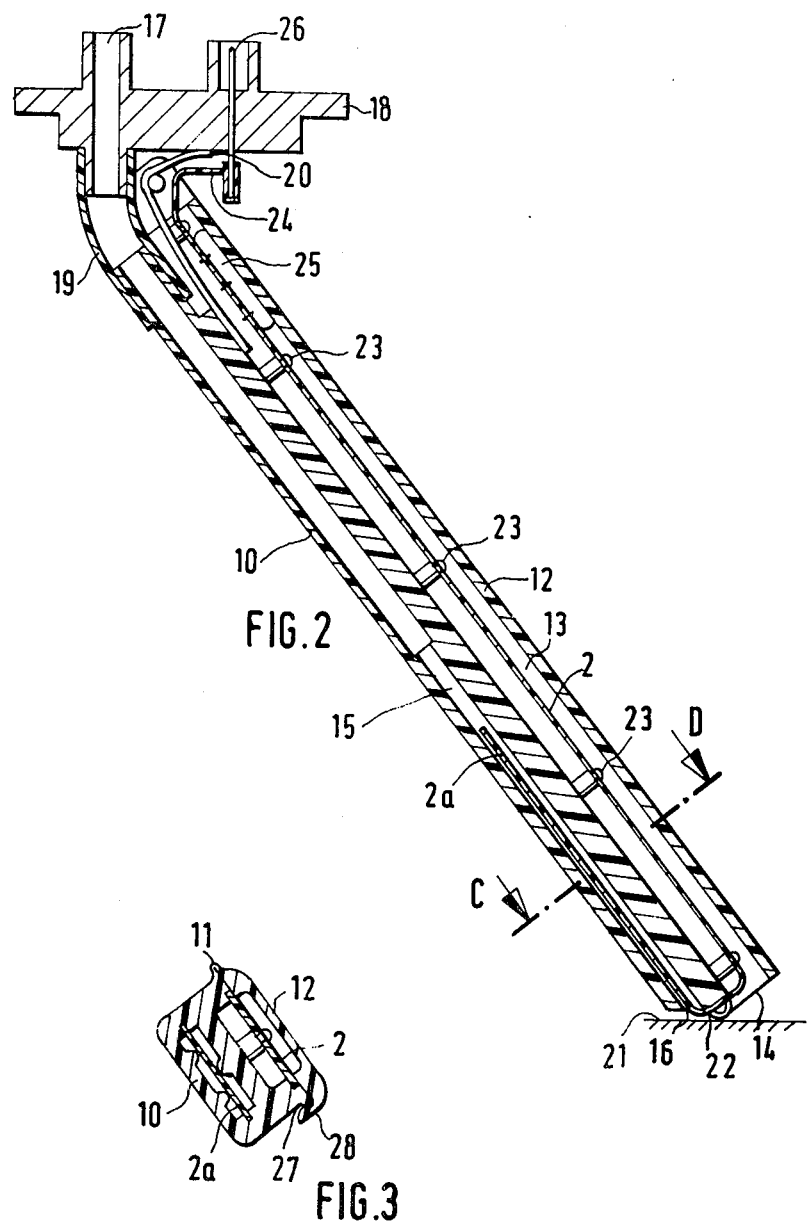

APPARATUS FOR CAPACITIVE FILLING-LEVEL MEASURING, PARTICULARLY IN A MOTOR VEHICLE TANK

BACKGROUND OF THE INVENTION

1. Field of the Invention

The invention relates to an apparatus for capacitive filling-level measuring, particularly in a motor vehicle tank, comprising a primary element with measuring electrodes provided on an oblong body and forming a measuring condenser, which electrodes are surrounded at a variable level by the medium to be measured, and further comprising compensation electrodes for the formation of a compensation condenser by which the effect of various dielectric constants of the medium upon the measuring result can be compensated in an evaluation circuit to which the measuring condenser and the compensation condenser are connected.

2. Prior Art

In a known apparatus of this type for capacitive filling-level measuring, a primary element has at least two concentric electrodes, fixed on a support. In detail, one of the electrodes consists of a conductive layer applied to an oblong insulating material plate as support, while the other electrode is shaped as an oblong metal support whereon the insulating material plate with the conductive layer facing the support is fixed. An evaluation circuit in hybrid construction, which contains an oscillator, is connected to the electrodes in order to generate an electric current suitable to indicate the filling-level. The evaluation circuit is fixed on the portion of the primary element that protrudes from the medium to be measured. Since in this apparatus, which contains only a measuring condenser formed by the electrodes, for measuring the filling-level, the dielectric constant of the medium to be measured enters the measuring result, wrong indications of the filling-level may occur. This applies especially in the filling-level measuring of fuels wherein the dielectric constant may vary with varying methanol content. In order to eliminate the indication differences based thereon, it is known in connection with the initially mentioned apparatus to provide, in addition to the two measuring electrodes forming the measuring condenser, at least one reference electrode, which is also called a compensation electrode. This reference electrode is produced by a further conductive layer on the insulating material plate. It forms, together with the portion of a metal supporter sheet metal strip facing it, a reference capacity or a compensation condenser. By means of this conpensation condenser the effects of differing dielectric constants upon the measuring result can be compensated. For this purpose, the evaluation circuit comprises an oscillator whose output is connected via a resistor in each case to the measuring condenser and the compensation condenser. The two condensers are connected to two inputs of a sum-and-difference amplifier in the output of which, e.g., a quotient meter is provided.

For the aforementioned compensation of the effects of differing dielectric constants of the medium to be measured, it is assumed that the compensation condenser is always equally surrounded, i.e. as a rule completely, by the medium. To this end, the compensation electrodes of the compensation condenser have hitherto been arranged above the bottom of the container wherein the medium to be measured is contained. This arrangement, however, means that the container must at any rate not be emptied below the level of these compensation electrodes. When the compensation electrodes are arranged too low on the container, there exists, moreover, the possibility that the medium which at this place surrounds the compensation electrodes is of another composition than the medium in the area of which the measuring electrodes are arranged. This applies especially to motor vehicle tanks wherein water contained in the fuel may be deposited in the course of time. Furthermore, this arrangement of the compensation electrodes near the bottom may have the result that the capacity of these compensation electrodes is relatively small if not too bulky an arrangement is to be put up with. Since, besides, the supply lines to these compensation electrodes are relatively long, the capacity formed by the supply lines must possibly also be compensated.

The aforementioned disadvantages prevail particularly when the compensation condenser is constructed in the manner known, per se, as a measuring condenser, in which construction the two electrodes are applied to an insulating material support in the form of two stripes engaging each other in a comblike manner.

SUMMARY OF THE INVENTION

The present invention has the principal object of developing further an apparatus of the initially mentioned type for capacitive filling-level measuring in such a way that the lodging of the compensating condenser on the primary element within the container with the medium to be measured, or in the motor vehicle tank, is no problem, so that the entire primary element with a measuring condenser and a compensation condenser can be easily and rapidly installed. The manufacture of the primary element itself should likewise be inexpensive.

This object is achieved, according to the invention, for an apparatus of the initially mentioned type in that the measuring electrodes and the compensation electrodes are arranged on or in an oblong common line separated sectionwise in such a manner that the compensation electrodes are located near at least one suction channel for the medium, and the measuring electrodes are located near the medium to be measured.

This primary element constructed as a line supports thus the measuring condenser as well as the compensation condenser. These condensers are separated in such a way that the capacity of the measuring condenser is essentially exclusively affected by the filling-level of the medium to be measured wherein the measuring electrodes run along the line, so that they extend from the bottom of the container upward to the point of the maximum filling-level. The compensation electrodes, on the other hand, are arranged in another section of the line in such a manner that constant area sections, i.e., as complete an area as possible of the compensation electrodes, are located in the most immediate influential area of the medium located in a suction channel. As the spatial coordination of the measuring electrodes with the suction channel is offhand constant—since the suction channel is always completely filled with the medium to be measured—the compensation electrodes are thus affected, not by a varying filling-level of the medium to be measured, but exclusively by the varying dielectric constants of this medium. The arrangement of the compensation electrodes on the suction channel presents the substantial advantage that the compensation electrodes may also be arranged at a distance from the bottom of the container, in which case the medium to be measured can be emptied to filling-levels lower than the compensation electrodes. Since, furthermore, the suction channel is usually traversed by the medium, variations of the measuring result on the basis of materials deposited on the bottom of the container will be practically impossible.

The section-wise separated arrangement of the compensation electrodes and the measuring electrodes on the common line may mean that the sections are formed in various longitudinal sections of the container. The section-wise separated arrangement, however, may also mean that the electrode arrangement is the same in all longitudinal sections, but that the sections which are provided with the measuring electrodes on the one hand and the compensation electrodes on the other hand are formed in the cross sections themselves. This is illustrated below in the preferred embodiment to be yet described. It may be mentioned at this point that in all cases the measuring electrodes and the compensation electrodes are electrically insulated with respect to the medium to be measured so that the ohmic resistance of this medium does not enter the measuring result.

In a first embodiment of the apparatus, the characteristics thereof consist in that a strip line is provided on whose upper section, in the extended state, the measuring electrodes are formed and on whose lower section the compensation electrodes are arranged and furthermore, that from the measuring condenser and the compensation condenser lines are passed upward upon the support, and finally that the lower section can be bent upward so that it can be introduced in a suction channel.

In this embodiment, therefore, a flat strip line of insulating material supports the arrangement of the measuring electrodes as well as that of the compensation electrodes. This arrangement is space-saving and presents the special advantage that only a single body, namely the strip line, must be produced and mounted for the realization of the compensation condenser and the measuring condenser. The lodging of this strip line then takes place in such a manner that the upper, larger section is surrounded by the medium to be measured at variable filling-levels, and that the lower section is bent upward in such a way that it projects into a suction channel which is continuously filled with the medium. Therefore, the medium can be sucked off down to the bottom of the container without impairment to the effect of the compensation condenser.

In a particularly advantageous manner, the embodiment described above of the apparatus is constructed with the characteristics that the measuring electrodes and the compensation electrodes each form two electrode arrangements that engage in a comblike manner, on each section of the strip line, which electrode arrangements are etched from a metal layer placed so as to be concealed on a rectangular insulating material strip.

In this embodiment, the measuring electrodes extend in longitudinal direction of the strip line, while the compensation electrodes may be arranged transversely thereto. In the comblike engaging form of the electrode arrangement, this electrode arrangement presents the advantage of a high capacity. The manufacture of this primary element with the electrodes etched from the covering insulating material strip is inexpensive in comparison with a separate manufacture of the measuring condenser and the compensation condenser.

This embodiment presents suitably the further characteristic that the evaluation circuit made in hybrid construction is arranged on the top of the upper section of the strip line.

The lines for the evaluation circuit can thus be line.

The lines for the evaluation circuit can thus be etched together with the electrodes from the covering insulating material strip. The evaluation circuit made in hybrid construction is in this embodiment mounted on the top in that section of the strip line which protrudes from the medium to be measured. This is to say the evaluation circuit is arranged on a section which contributes nothing to the formation of the measuring condenser and the compensation condenser.

Furthermore, in connection with the embodiment above described, a construction is particularly advantageous wherein for the reception of the strip line, a support element is provided with a main body and a cover that can be opened up by hinges and can be locked by locking means, furthermore that between the cover and main body a hollow space with at least one opening for the access of the medium to be measured is formed for receiving the upper section of the strip line, and finally, that the suction channel is arranged parallel to the said hollow space in the main body in which suction channel the bent-around lower section of the strip line with the compensation electrodes is introduced.

This device supplements suitably the strip line because by means of the support element a safe coordination of the individual sections of the strip line with the medium to be measured is assured. The upper section of the strip line which supports the measuring electrodes is thus surrounded by the medium to be measured at the prevailing filling-level, while the section bent upward which supports the compensation electrodes extends into the suction line provided in the support element. The strip line can simply be inserted in the opened support element and can be locked therein by folding down and locking the cover of the support element.

For the last-mentioned purpose, the strip line can be advantageously clamped between the cover and the main body.

For the further exact alignment of the support element, the apparatus is advantageously developed with the characteristic that in the hollow space of the support element, centering pins for receiving the strip lines are provided.

Due to the simple manufacture of the individual parts of the support element and the fact that these cannot be lost, the apparatus excels in that the support element consists of plastic material and that the cover which can be opened by hinges is connected with the main body by at least one film hinge.

The assembly of the apparatus can be simplified by providing the apparatus with the characteristics that the support element is pivotable at the top and provided with a spring which presses the support element against the bottom of the container that holds the medium.

In a second embodiment of the apparatus, the latter is provided with the characteristics that the line is constructed as a round cable of plastic material, furthermore that in the cable two concentric annular arrangements of spaced electrodes are inserted as conductor lines, and finally that between the electrodes hollow chambers are provided, that the chambers can be connected as suction chambers between the electrodes connected as compensation electrodes on the inner circular arrangement, and the chambers communicate between the electrodes serving as measuring electrodes on the outer annular arrangement, with the medium to be measured.

This primary element is particularly advantageous since it is uniformly shaped along its entire longitudinal extent so that it can be continually manufactured without special discontinuous manufacturing steps. The line produced in any desired length needs only to be cut off for a length corresponding to the container depth in order to form the primary element. A special support for this primary element is likewise not necessary since it contains the channels wherein the medium to be measured communicates as well as the channels that act as suction channels. These channels are coordinated in a constant fixed manner with the measuring electrodes and the compensation electrodes, and for the establishment and maintenance of this coordination no special measures need to be taken in the assembly.

In this apparatus it is suitable to provide that the cable consist of extruded plastic material wherein the electrodes are embedded. The manufacture of this primary element takes place in the extrusion process, for which purpose a plastic material is used which is resistant to the medium to be measured.

BRIEF DESCRIPTION OF THE DRAWINGS

The invention is explained in the following with the aid of the drawings wherein:

FIG. 2 shows the primary element lodged in a support element in a longitudinal section;

FIG. 3 shows the support element with primary element in a cross section in the plane C-D in FIG. 2;

DETAILED DESCRIPTION OF THE PREFERRED EMBODIMENTS

Figure 1:
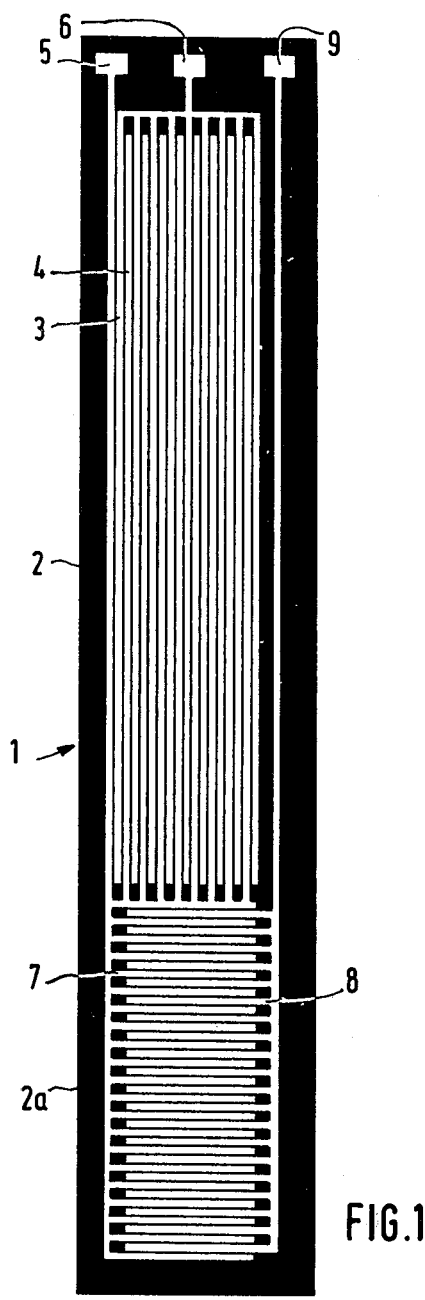
FIG. 1 is a view of a primary element constructed as a strip line, shown in an extended state.

FIG. 1 shows a primary element which is constructed as strip line. The strip line consists of a rectangular insulating material strip 1 with a concealed metal layer from which electrode arrangements are etched.

In detail, two comblike engaging electrode arrangements 3 and 4 are etched from an upper section 2 of the insulating material strip, which electrode arrangements 3 and 4 extend in the longitudinal direction of the insulating material strip. These electrode arrangements 3 and 4 form a measuring condenser, and the electrodes are consequently called measuring electrodes. For connecting the measuring condenser to an evaluation circuit, not shown, connections 5 and 6 are employed.

In a lower section of the extended insulating material strip, two comblike engaging electrode arrangements 7 and 8 are likewise etched. These electrode arrangements which extend transversely to the insulating material strip form a compensation condenser, and the electrodes are consequently called compensation electrodes. For connecting the compensation condenser to the evaluation circuit, a connecting line 9 is provided, while the connecting line 5 of the measuring condenser serves also to connect the compensation condenser.

The strip line is flexible, so that the lower section 2a can be bent upward, and in this state the medium to be measured flows around it, as will yet be shown.

On the top of the upper section 2, the evaluation circuit made in hybrid construction may be provided directly on the strip line. This makes it possible to keep the electric connections between the evaluation circuit and the electrodes particularly short.

The electrodes of the measuring condenser and the compensation condenser, as well as the evaluation circuit form in this manner a one-piece unit. For securing the assembly in a container, especially in a motor vehicle tank, the strip line shown in FIG. 1 is lodged in a support element which is shown in FIGS. 2 and 3.

The support element of plastic material consists of a main body 10 wheron via a film hinge 11 a cover 12 is mounted. Between the cover and main body a channel 13 extending in longitudinal direction of the support element is formed which is provided with an opening 14 for the access of the medium to be measured. A suction channel 15 is arranged parallel to this channel 13 in the main body, which suction channel 15 extends between an opening 16 and a suction pipe 17.

The suction pipe formed out of a flange 18 is connected in a pivotable manner via a hose 19 to the body 10. Furthermore, a spring 20 is provided between the flange and the support element, namely in such a way that it tends to pivot the support element toward a bottom 21 of the container.

The strip line is inserted in the support element in such a manner that the upper section 2 of the strip line is located inside channel 13. The strip line is bent around a knee 22, so that the lower section 2a extends parallel to the upper section 2, likewise in upward direction. This section 2a, which at the extended state is the lower one, extends therefore in the support element parallel to the upper section 2. Upper section 2 is centered in channel 13 on a centering pin 23 formed out of the inside of the support element. It is in this position clamped between cover 12 and main body 10. Connection lines 24 connect the evaluation circuit 25 mounted on the strip cable to plugs 26 inserted in flange 18.

The complete unit shown in FIG. 2, consisting of the flange and the support element with the strip line lodged therein can be very simply inserted in a container, especially a motor vehicle tank.

Viewing FIG. 2, it is further pointed out that the strip line is lodged in the support element in such a manner that the medium to be measured can reach, without difficulty in channel 13 as well as in suction channel 15, the strip cable, especially the electrodes, and can flow without difficulty around the latter, in which process only the electrodes are electrically insulated against the medium to be measured, by a thin layer.

FIG. 3 shows also the locking means formed from a projection 27 on the main body and a grooved-out recess 28 on the cover, by which locking means the cover is locked on the main body when the strip line is clamped between the cover and the main body.

Figure 4:
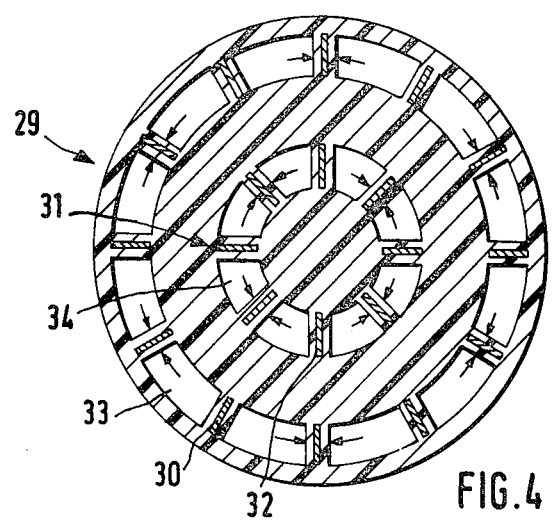
FIG. 4 is a cross-sectional view of a primary element constructed as a cable in a first embodiment.

FIG. 4 shows in cross section a line constructed as a round cable, with the electrodes therein. In detail, two annular electrode arrangements are inserted in the cable which consists of plastic material. In this structure, the electrodes are flat and radially aligned. The outer annular electrode arrangement 29 consists of the two measuring electrodes 30, electrically arranged similar to the engaging comb like electrodes 3 and 4, and the inner annular electrode arrangement 31 consists of two compensation electrodes 32 with similar electrical arrangement as at 7 and 8 above. Between each two electrodes of the outer annular electrode arrangement as well as the inner annular electrode arrangement, a channel 33 shaped as an annular segment or a suction channel 34 is provided.

The cable with the electrodes and channels or suction channels may be manufactured continuously in the extrusion process. The cable, in order to be employed for filling-level measuring, is then merely cut to length at the suitable level and connected. To this end, the suction channels are connected with a suction pipe, so that the medium to be measured can flow through them, while the channels between the outer annular electrode arrangement communicate only with the medium to be measured in the container, so that the medium in the channels adjusts itself at the same level as in the container. The annularly arranged measuring electrodes are connected analogously to the electrode connection shown in FIG. 1, so that the lines of force pass between the electrodes through the chambers 34. In the same manner, the compensation electrodes of the inner electrode arrangement are electrically connected, so that here the lines of force pass through the suction chambers. The measuring electrodes and the compensation electrodes are in each case insulated against the adjacent chambers or suction chambers by a thin plastic material layer wherein they are embedded.

Figure 5:
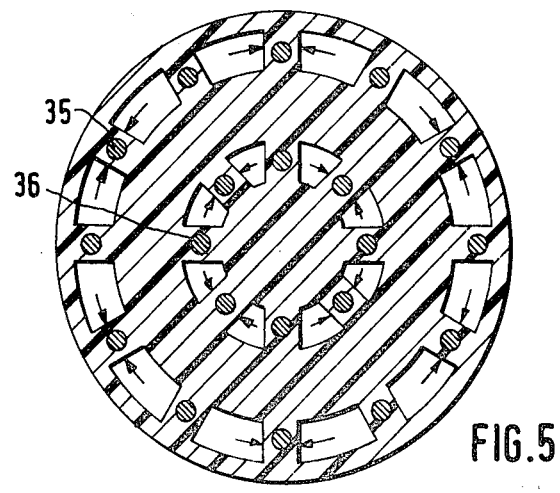
FIG. 5 is a cross-sectional view of a primary element constructed as cable in a second embodiment.

FIG. 5 shows an embodiment of the line with the electrodes similar to that of the cable in FIG. 4, in which structure, however, the measuring electrodes 35 and the compensation electrodes 36 are not flat but shaped with a circular cross section. Thereby, the manufacture is still further simplified since here the angular positions of the electrodes with respect to their longitudinal axis are irrelevant.

We claim:

1. For use with a container from which a medium is withdrawn through a suction passage to establish a variable level of the medium above a bottom of the container,
and apparatus for measuring said level of the medium within the container having insulated electrodes immersed in said medium to form measuring and compensation capacitors, the capacitances of which are dependent on the dielectric constant of the medium, the improvement comprising insulating means within which said electrodes are disposed in nonconductive relation to the medium and having separate sections within which the electrodes respectively form the measuring and compensation capacitors, and support means mounting only one of the separate sections of the insulating means in constant operative relation to the medium within said suction passage and the other of the sections externally of the suction passage within the container.

2. The improvement as defined in claim 1 wherein said insulating means comprises an elongated material strip, said strip being bent to a configuration wherein a lower one of said sections extends upwardly into the suction passage from the upper one of the sections adjacent the bottom of the container.

3. The improvement as defined in claim 2 wherein the capacitors include terminals connected to said electrodes and embedded within the upper section adjacent an upper end thereof.

4. The improvement as defined in claim 3 wherein said support means comprises a body receiving therein the strip in substantially parallel spaced relation to the suction passage, a cover hingedly connected to the body and means for locking the cover to the body in enclosing relation to the strip.

5. The improvement as defined in claim 4 including means for clamping the strip between the cover and the body.

6. The improvement as defined in claim 4 including centering pins supporting the strip within the body.

7. The improvement as defined in claim 4 including means for pivotally mounting the body above the container, and spring means for biasing the body into engagement with the bottom of the container.

8. The improvement as defined in claim 1 wherein said support means comprises a body receiving therein the insulating means in substantially parallel spaced relation to the suction passage, a cover hingedly connected to the body and means for locking the cover to the body in enclosing relation to the strip.

9. The improvement as defined in claim 8 including means for pivotally mounting the body above the container, and spring means for biasing the body into engagement with the bottom of the container.

10. The improvement as defined in claim 1 wherein said insulating means is an elongated cable, said electrodes being embedded in the cable angularly spaced from each other within said separate sections cross-sectionally constituted by radially spaced annular portions of the cable, the suction passage being established by a first set of chambers formed in said one of the separate sections between the electrodes forming the compensation capacitor, the other of the separate sections being formed with a second set of chambers filled with the medium between the electrodes forming the measuring capacitor.

11. The improvement as defined in claim 10 wherein said cable is made of a plastic material constituting the support means radially inwardly of and between said annular portions of the cable.

* * * * *